G. JAMES, S. BENSON & W. WILSON.
DETACHABLE PIPE OR HOSE COUPLING.
APPLICATION FILED OCT. 10, 1907.
913,144.  Patented Feb. 23, 1909.
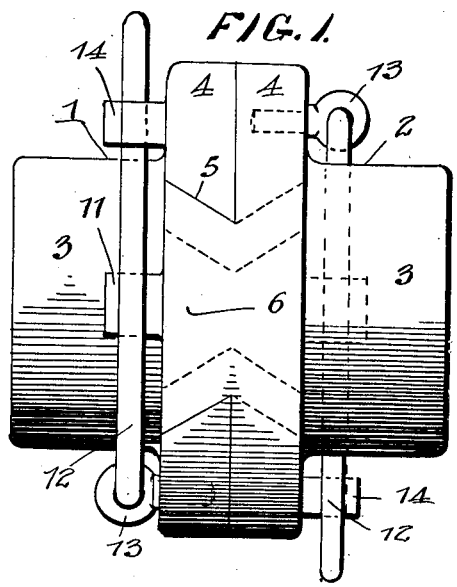
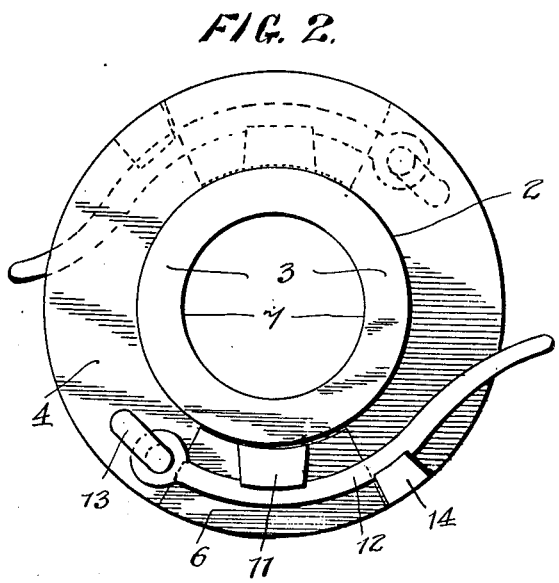
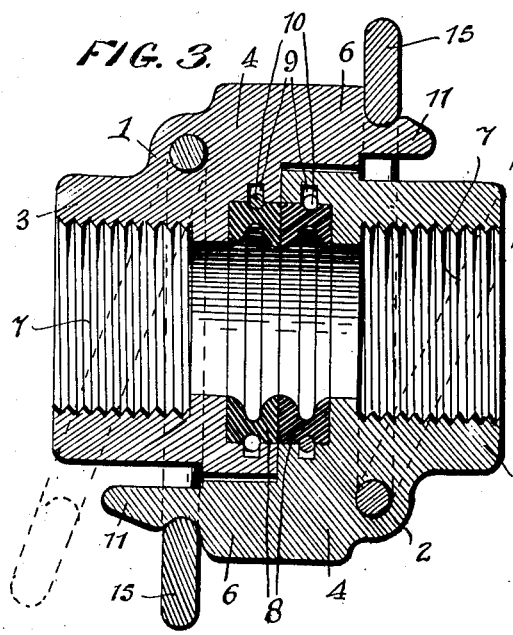
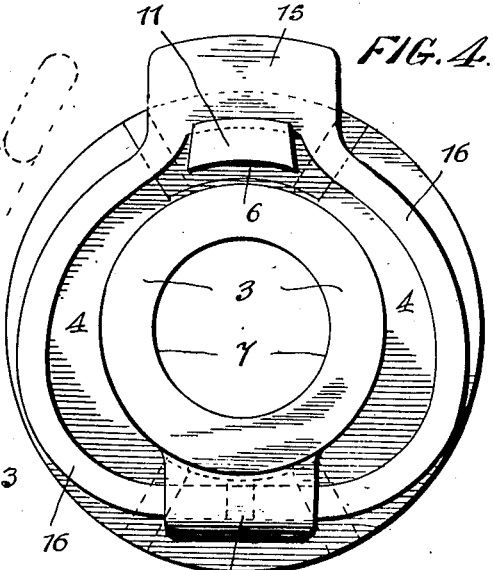
WITNESSES
Inventors,
George James
Samuel Benson,
and William Wilson
by
Attorney

UNITED STATES PATENT OFFICE.

GEORGE JAMES, SAMUEL BENSON, AND WILLIAM WILSON, OF CHICAGO, ILLINOIS.

DETACHABLE PIPE OR HOSE COUPLING.

No. 913,144.  Specification of Letters Patent.  Patented Feb. 23, 1909.

Application filed October 10, 1907. Serial No. 396,832.

*To all whom it may concern:*

Be it known that we, GEORGE JAMES, SAMUEL BENSON, and WILLIAM WILSON, citizens of the United States, residing at Chicago, in the county of Cook and State of Illinois, have invented certain new and useful Improvements in Detachable Pipe and Hose Couplings, of which the following is a specification.
Our invention relates to a detachable pipe or hose coupling and the objects thereof are to provide a coupling which will be light, compact and inexpensive, which may be instantly coupled or uncoupled without the use of wrenches or special tools, and in which the coupling members are identical in construction and operation.

Our advantages in the construction and operation will appear in the course of the following description, reference being had to the accompanying drawings, forming a part of this specification, in which like numerals are used to designate like parts throughout the several figures, and in which—

Figure 1 is a side elevation of two coupling members constructed in accordance with my invention, in the coupling position, and illustrating one form of fastening means, Fig. 2 is an end elevation thereof, Fig. 3 is a central longitudinal sectional view taken through a pair of coupling members in a coupling position and illustrating another form of fastening means, and Fig. 4 is an end elevation thereof.

In the practical embodiment of our invention we provide a pair of coupling members 1 and 2 each comprising a tubular portion 3 having a circular flange 4 extending therefrom. The flanges 4 are each provided with dovetail slots 5 and dovetail projections 6 opposite said slots. The tubular portions 3 of the members 1 and 2 are provided each with a central bore 7 set for a distance from the outer end thereof, for the reception of a pipe or hose secured therein, and provided adjacent their inner ends in said bore with circular cut-out portions in which elastic gaskets 8 are adapted to fit and to abut one another when the members 1 and 2 are coupled as shown in Fig. 3. Seated in circular recesses 9 extending around the cut-out portions in which the gaskets 8 are placed, are split spring rings 10, adapted to tightly clasp the exterior surface of the gaskets 8 to hold the same within their respective members when the same are uncoupled. Each of the dovetail projections 6 are provided with forwardly extending noses 11 having curved recesses in the upper faces thereof for the reception of suitable fastening means after engagement through the dovetail slots 5. In the form of fastening means shown in Figs. 1 and 2, a curved spring retaining bar 12 is provided upon each coupling member said bar having an eye-loop at one end thereof, and said loop being secured through and swinging upon an eye-bolt 13 threaded or otherwise secured within the flange 4 of its respective coupling member. The retaining bars 12 are each secured as described on one side of the slots 5, the flange 4 being provided on the opposite side of said slots with a retaining block 14 provided with a recessed inner face and adapted to receive the free end of the retaining bar 12 from under after the same has been associated over the nose 11 when the coupling members 1 and 2 are assembled. Thus the same may be firmly locked.

The fastening means illustrated in Figs. 3 and 4 comprises a retaining plate 15 carried by each of the members 1 and 2, arranged opposite their slots 5 and having spring arms 16 curved about the tubular portions 3 of said members and having their ends projecting within openings in an enlarged bracket portion 17 opposite the dovetail projection 6.

Having thus fully described our invention, we claim:

1. The combination in a coupling of the character described, of coupling members of identical construction, each comprising a tubular portion having a central bore and an outstanding circular flange at one end thereof, adapted to abut the flange of the opposing member, said flanges being provided with oppositely disposed wedge-shaped slots and wedge-shaped projections adapted to be engaged by relatively opposite sidewise movements of said members, said slots being formed through the entire width of said flanges, said projections being of substantially the same width as said flanges and being provided with forwardly extending portions beyond said slots, and locking members pivotally mounted upon said flanges and spanning said slots to engage over said projecting portions, substantially as described.

2. The combination in a coupling of the character described, of coupling members of identical construction, each comprising a tubular portion having a central bore and an outstanding circular flange at one end thereof adapted to abut the flange of the opposing member, said flanges being provided with oppositely disposed wedge-shaped slots and wedge-shaped projections adapted to be engaged by relatively opposite side-wise movements of said members, said slots being formed through the entire width of said flanges, said projections being of substantially the same width as said flanges, and being provided with forwardly extending portions beyond said slots, said flanges being further provided with projections extending therefrom at one side of their said slots, and locking members pivotally mounted upon said flanges at the opposite sides of their said slots to their said projections and adapted for engagement over the said forwardly projecting portions of said wedge-shaped projections and beneath the said flanged projections, to lock said members together, substantially as described.

In testimony whereof we affix our signatures in presence of two witnesses.

GEORGE JAMES.
SAMUEL BENSON.
WILLIAM WILSON.

Witnesses:
 BARNEY J. STUART,
 F. C. SHAFER.